United States Patent
Wei et al.

(10) Patent No.: US 9,063,301 B2
(45) Date of Patent: Jun. 23, 2015

(54) OPTICAL FIBER CONNECTOR

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Le-Peng Wei, Shenzhen (CN); Zhi-Ming Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 56 days.

(21) Appl. No.: 14/014,831

(22) Filed: Aug. 30, 2013

(65) Prior Publication Data
US 2014/0212096 A1 Jul. 31, 2014

(30) Foreign Application Priority Data
Jan. 25, 2013 (CN) .......................... 2013 1 00287469

(51) Int. Cl.
G02B 6/36 (2006.01)
G02B 6/38 (2006.01)

(52) U.S. Cl.
CPC ............ *G02B 6/3887* (2013.01); *G02B 6/3869* (2013.01)

(58) Field of Classification Search
USPC .......................................................... 385/81
See application file for complete search history.

(56) References Cited

U.S. PATENT DOCUMENTS

| | | | |
|---|---|---|---|
| 5,559,917 A | 9/1996 | Ott | |
| 6,422,764 B1* | 7/2002 | Marrs | 385/81 |
| 7,731,429 B2 | 6/2010 | Ohtsuka et al. | |
| 8,905,650 B2* | 12/2014 | Ishida et al. | 385/77 |
| 2011/0044588 A1* | 2/2011 | Larson et al. | 385/81 |
| 2012/0106899 A1 | 5/2012 | Choi | |
| 2013/0266269 A1* | 10/2013 | Li et al. | 385/81 |
| 2014/0161395 A1* | 6/2014 | Klavuhn et al. | 385/81 |

FOREIGN PATENT DOCUMENTS

| | | |
|---|---|---|
| CN | 101421649 A | 4/2009 |
| CN | 102122031 A | 7/2011 |
| CN | 202600192 U | 12/2012 |
| WO | 2005047947 A1 | 5/2005 |

\* cited by examiner

*Primary Examiner* — Sung Pak
(74) *Attorney, Agent, or Firm* — Novak Druce Connolly Bove + Quigg LLP

(57) ABSTRACT

An optical fiber connector, for clamping an optical fiber cable, includes a housing, a fiber clamping assembly, a fiber ferrule, and a fixing assembly. The fiber ferrule is clamped at an end of the fiber clamping assembly. The fixing assembly includes a mounting seat, a fixing seat received in the mounting seat, and a covering member rotatably mounted on the mounting seat to clamp to the fixing seat. The housing is sleeved on an end of the mounting seat, and the fiber clamping assembly and the fiber ferrule are received in the mounting seat. The fixing seat comprises a fixing post axially defining a through hole; the fiber ferrule is aligned to the fixing post.

20 Claims, 4 Drawing Sheets

OPTICAL FIBER CONNECTOR

BACKGROUND

1. Technical Field

The present disclosure relates to an optical fiber connector, and more particularly, to a field-installable optical fiber connector.

2. Description of Related Art

A field-installable optical fiber connector includes a housing and a boot assembled to the housing. The housing includes an outer screw thread portion. The boot includes an inner screw thread portion and defines a through hole therein for an optical fiber extending therethrough. The boot is sleeved on the housing, and the inner screw thread portion of the boot engages with the outer screw thread portion to secure the boot to the housing. The optical fiber may include a plurality of Kevlar lines clamped between the outer screw thread portion of the housing and the inner screw thread portion of the boot. However, dimensions of the through hole of the boot are fixed or unchangeable, such that the boot is just adaptable or configured to receive one kind of optical fiber having a special or particular size.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
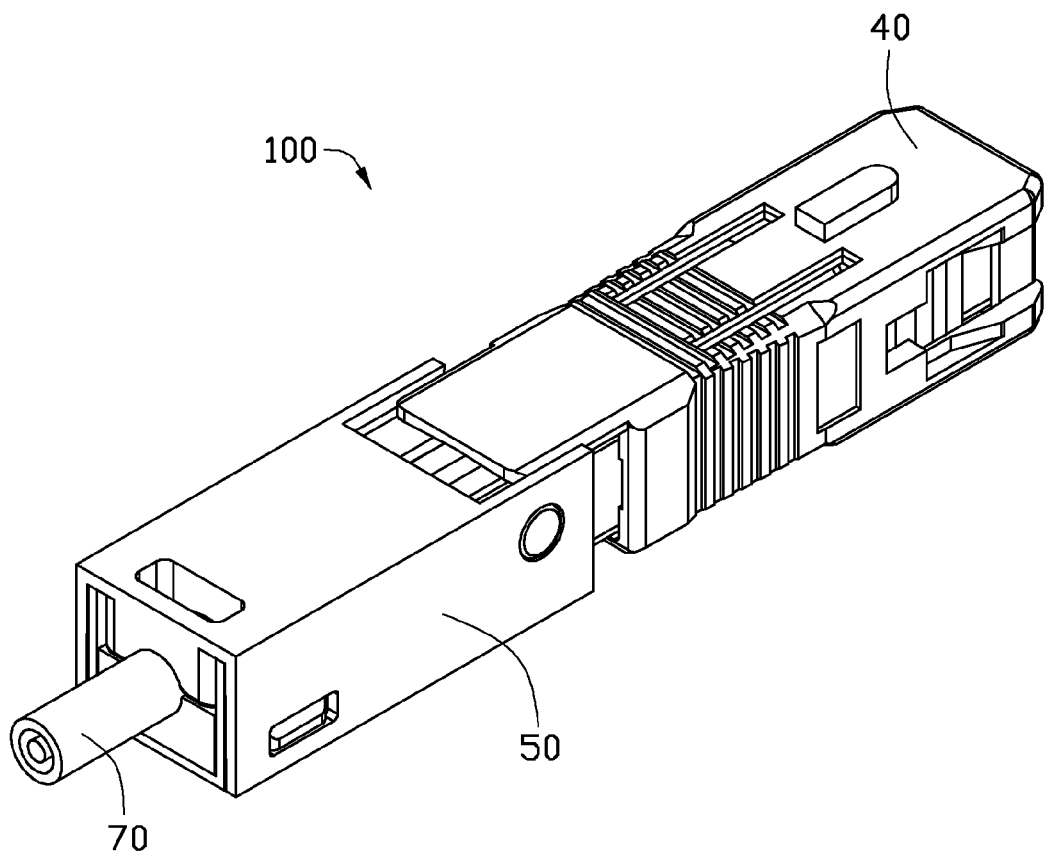
FIG. 1 is an isometric view of an embodiment of an optical fiber connector clamping an optical fiber.
Figure 2:
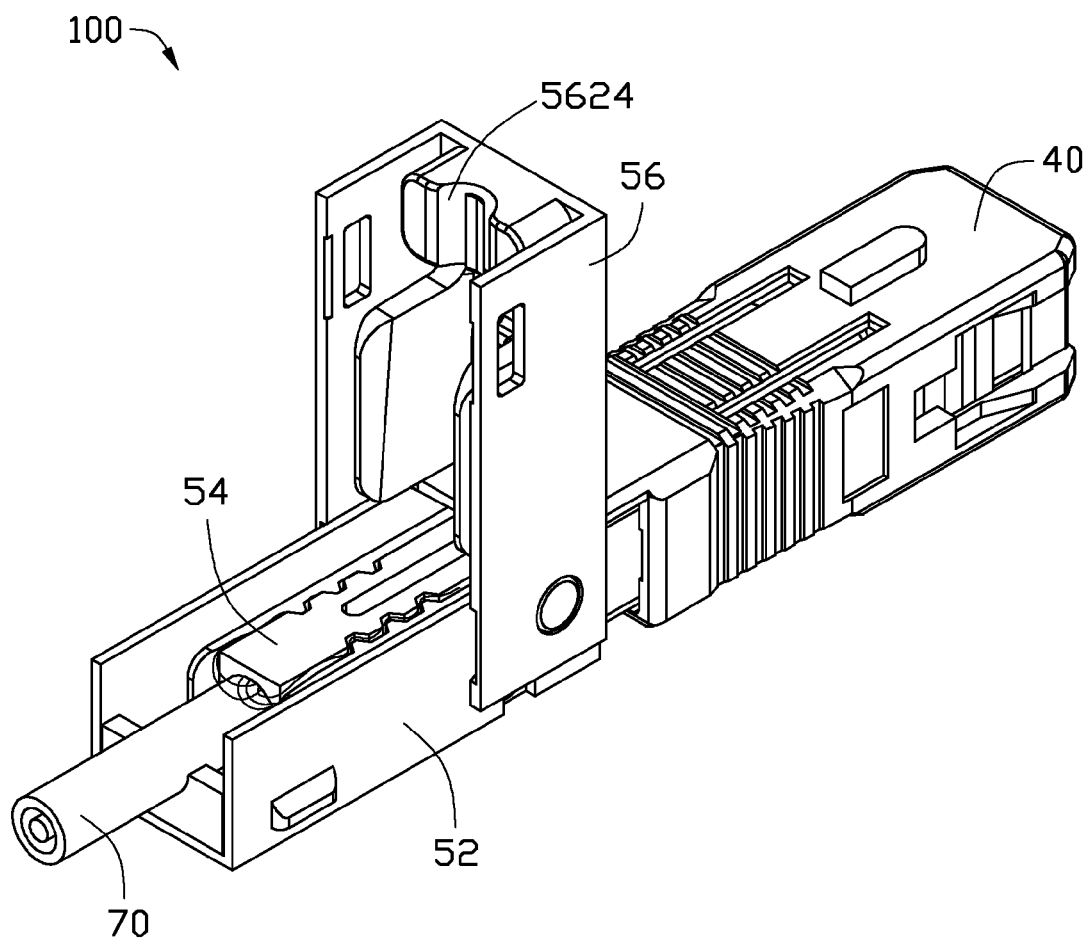
FIG. 2 is similar to FIG. 1, but with a covering member flapped.
Figure 3:
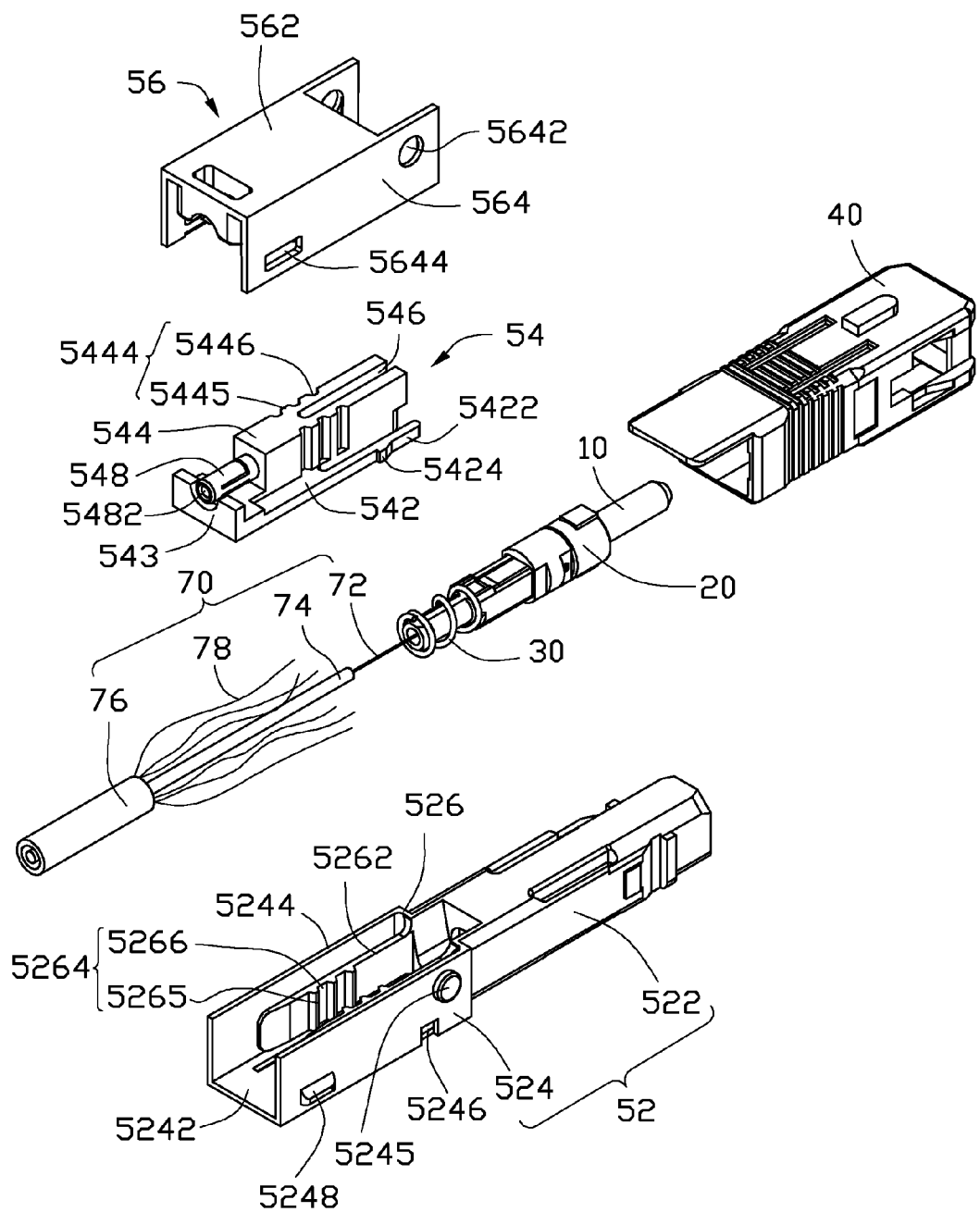
FIG. 3 is an exploded, isometric view of the optical fiber connector of FIG. 1.

FIGS. 1 through 3 show an embodiment of an optical fiber connector 100. The optical fiber connector 100 includes a fiber ferrule 10, a fiber clamping assembly 20, an elastic member 30, a housing 40, and a fixing assembly 50. The fiber ferrule 10 is clamped at an end of the fiber clamping assembly 20, the elastic member 30 is sleeved on an end of the fiber clamping assembly 20 away from the fiber ferrule 10. The fiber clamping assembly 20 is clamped with the fixing assembly 50. The housing 40 is sleeved on an end of the fixing assembly 50.

The optical fiber connector 100 is employed to clamp an optical fiber cable 70. The optical fiber cable 70 includes an optical fiber 72, an inner wrapping sleeve 74, an outer wrapping sleeve 76, and a plurality of Kevlar lines 78. The inner wrapping sleeve 74 is cylindrical and sleeved on the optical fiber 72, the outer wrapping sleeve 76 is cylindrical and sleeved on the inner wrapping sleeve 74. The plurality of Kevlar lines 78 is clamped between the inner wrapping sleeve 74 and the outer wrapping sleeve 76. In the embodiment, the outer wrapping sleeve 76 and the inner wrapping sleeve 74 are partially removed to expose part of the Kevlar lines 78 surrounding the inner wrapping sleeve 74 and an end of the optical fiber 72, such that the optical fiber cable 70 can be assembled to the optical fiber connector 100 more conveniently.

In the illustrated embodiment, the optical fiber connector 100 is an SC type connector. The housing 40 is rectangular and hollow, and is employed in an SC type connector. The shape of the housing 40 may be changed to be employed in optical fiber connectors of other types, such as an FC or LC type optical fiber connector.

The fixing assembly 50 includes a mounting seat 52, a fixing seat 54, and a covering member 56. The fixing seat 54 is received in the mounting seat 52, the covering member 56 is rotatably assembled to the mounting seat 52 and engages with the fixing seat 54 to clamp the optical fiber cable 70.

Figure 4:
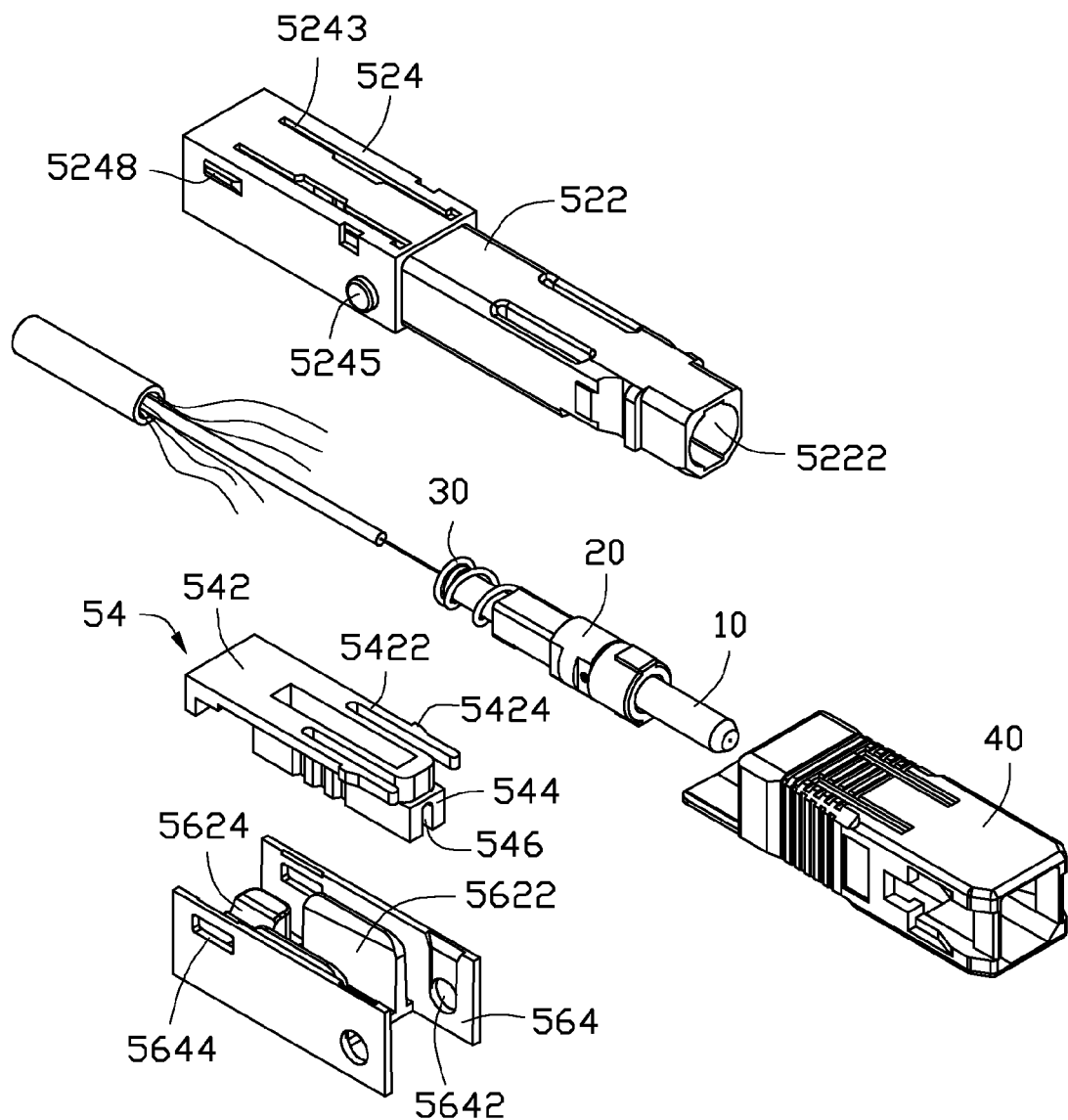
FIG. 4 is similar to FIG. 3, but viewed from another aspect.

Also referring to FIG. 4, the mounting seat 52 includes a sleeve 522, and a fixing portion 524 protruding from an end of the sleeve 522. The sleeve 522 axially defines a receiving hole 5222 for receiving the fiber clamping assembly 20.

The fixing portion 524 is substantially a rectangular frame, and includes a bottom plate 5242, a pair of sidewalls 5244 protruding from opposite sides of the bottom plate 5242, and a pair of connection portions 526 connecting the pair of sidewalls 5244 with the sleeve 522. A longitudinal direction of the sidewall 5244 is parallel to an axis of the sleeve 522. A distance between the two sidewalls 5244 is greater than a diameter of the sleeve 522, such that the connection portion 526 and the corresponding sidewall 5244 cooperatively form a stepped shape. Longitudinal directions of the pair of connection portions 526 are perpendicular to the axis of the sleeve 522. A pair of engaging arms 5262 respectively extends from the pair of connection portions 526 along the longitudinal direction of the fixing portion 524. Each engaging arm 5262 includes a clamping portion 5264 facing the other engaging arm 5262. The clamping portion 5264 includes a plurality of first engaging protrusions 5265 protruding from the engaging arm 5262, thereby forming a plurality of first engaging grooves 5266. Each first engaging groove 5266 is bounded by two adjacent first engaging protrusions 5265. Each first engaging protrusion 5265 is in a strip cone shape and extends along a direction perpendicular to the axis of the sleeve 522.

The bottom plate 5242 defines a pair of slits 5243 extending along a direction parallel to the axis of the sleeve 522. Each sidewall 5244 includes a positioning post 5245 and a clamping protrusion 5248, and defines a first clamping groove 5246. The positioning post 5245 extends from a side of an end of the sidewall 5244 along a direction away from the other sidewall 5244. The clamping protrusion 5248 is located at a side of the sidewall 5244 away from the positioning post 5245. The first clamping groove 5246 is defined at an edge portion of the sidewall 5244 connecting with the bottom plate 5242, and is adjacent to the end of the sidewall 5244 where the positioning post 5245 is located. The clamping protrusion 5248 protrudes from the end of the sidewall 5244 opposite to the positioning post 5245 along a direction away from the other sidewall 5244.

The fixing seat 54 includes a main body 542, a securing portion 544 protruding from the main body 542, a pair of elastic arms 5422 extending from an end of the main body 542, and a supporting portion 543 protruding from an opposite end of the main body 542. The pair of elastic arms 5422 is parallel to each other and located at opposite sides of the fixing seat 54. Each elastic arm 5422 includes a latching portion 5424 received in the first clamping groove 5246 of the fixing portion 524. The securing portion 544 is substantially in a "U" shape, and defines a mounting groove 546. The securing portion 544 further includes a pair of engaging portions 5444 on opposite sides of the mounting groove 546 and a fixing post 548. The pair of engaging portions 5444 bend the mounting groove 546. Each engaging portion 5444 includes a plurality of second engaging protrusions 5445 on an outer surface thereof, thereby forming a plurality of second engaging grooves 5446. Each second engaging groove 5446 is bounded by two adjacent second engaging protrusions 5445. In the embodiment, the second engaging protrusion 5445 is in a strip cone shape and extends along a direction perpendicular to the longitudinal direction of the main body 542. The fixing post 548 protrudes from an end of the pair of engaging portions 5444 and is located above the supporting portion 543.

The covering member 56 is substantially a rectangular frame, and includes a base plate 562, a pair of side plates 564 extends from opposite sides of the base plate 562, a pair of clamping arms 5622, and a resisting portion 5624. The pair of side plates 564 is parallel to each other. The pair of clamping arms 5622 protrudes from the base plate 562 and is parallel to the pair of side plates 564. The pair of clamping arms 5622 is located between the pair of side plates 564. Each clamping arm 5622 is undergone a chamfering process. The resisting portion 5624 is located at an end of the base plate 562 and between the pair of the side plates 564. The resisting portion 5624 engages with the supporting portion 543 of the fixing seat 54. Each side plate 564 defines a positioning hole 5642 and a latching groove 5644 at opposite ends thereof. The positioning hole 5642 is located at an end of the side plate 564 away from the resisting portion 5624 to receive the positioning post 5245 of the fixing portion 524. The latching groove 5644 receives the clamping protrusion 5248 of the sidewall 5244.

FIGS. 1-4 show that in assembly, the fiber ferrule 10 and the elastic member 30 are installed to the clamping assembly 20. The clamping assembly 20 is received in the sleeve 522. The fixing seat 54 is received in the fixing portion 524 with the pair of latching portions 5424 latching with the pair of clamping grooves 5246. The plurality of second engaging protrusions 5445 is received in the plurality of first engaging grooves 5266. The plurality of first engaging protrusions 5265 latches with the plurality of second engaging grooves 5446. The fiber ferrule 10 is aligned to the fixing post 548. The fixing post 548 has a through hole 5482 formed at one end thereof. The optical fiber cable 70 extends though the through hole 5482 and is received in the clamping assembly 20. The clamping assembly 20 tightly clamps the optical fiber cable 70. The outer wrapping sleeve 76 is sleeved on the fixing post 548, and the inner wrapping sleeve 74 is received in the through hole 5482 of the fixing post 548. The plurality of Kevlar lines 78 are clamped between the clamping portion 5264 and the engaging portion 5444. The pair of positioning holes 5642 is respectively sleeved on the pair of positioning posts 5245 to rotatably assembly the covering member 56 to the fixing portion 524. The housing 40 is sleeved on the sleeve 522.

The covering member 56 is rotated until the pair of clamping portions 5248 latch into the pair of latching grooves 5644. At this time, the pair of clamping arms 5622 is partially received in the pair of slits 5243. The pair of clamping arms 5622 clamps the pair of engaging arms 5262, to enable the plurality of second engaging protrusions 5445 of the fixing seat 54 to resist the plurality of first engaging grooves 5266, the plurality of first engaging protrusion 5265 resist the plurality of second engaging grooves 5446. Therefore, the clamping portion 5264 and the engaging portion 5444 can clamp the plurality of Kevlar lines 78 at maximum tightness. The resisting portion 5624 of covering member 56 and the supporting portion 543 cooperatively clamp the outer wrapping sleeve 76.

In the optical fiber connector 100, the securing portion 544 includes the fixing post 548, and the outer wrapping sleeve 76 is sleeved on the fixing post 548 to secure the optical fiber cable 70. Because inside diameters of the outer wrapping sleeves 76 of the optical fibers 72 of different types are substantially the same, the optical fiber cables 70 of different types can be sleeved on the fixing post 548. Therefore, the optical fiber connector 100 is adapted to receive the optical fiber cables 70 having different sizes. a pair of clamping arms 5622 is between the pair of side plates 564. In addition, the covering member 56 is rotatably connected to the fixing portion 524 of the mounting seat 52 and latches with the fixing portion 524 used to clamp the optical fiber cable 70, such that assembling or disassembling of the optical fiber cable 70 is more convenient.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An optical fiber connector for clamping an optical fiber cable, the optical fiber cable comprising an optical fiber, an inner wrapping sleeve sleeved on the optical fiber, an outer wrapping sleeve sleeved on the inner wrapping sleeve and a plurality of Kevlar lines clamped between the inner wrapping sleeve and the outer wrapping sleeve, the optical fiber connector comprising:
   a housing;
   a fiber clamping assembly;
   a fiber ferrule clamped at an end of the fiber clamping assembly; and
   a fixing assembly, comprising:
      a mounting seat;
      a fixing seat received in the mounting seat; and
      a covering member rotatably mounted on the mounting seat to clamp the fixing seat therebetween, wherein the housing is sleeved on an end of the mounting seat, the fiber clamping assembly and the fiber ferrule are received in the mounting seat, the fixing seat comprises a fixing post axially defining a through hole; the fiber ferrule is aligned to the fixing post, the inner wrapping sleeve is received in the through hole, the outer wrapping sleeve is sleeved on the fixing post, so as to assemble the optical fiber cable to the fixing seat.

2. The optical fiber connector of claim 1, wherein the mounting seat comprises a sleeve and a fixing portion protruding from an end of the sleeve, the sleeve axially defines a receiving hole, the housing is sleeved on the sleeve, and the fiber clamping assembly is received in the receiving hole.

3. The optical fiber connector of claim 2, wherein the fixing seat further comprises a main body and a securing portion protruding from the main body, the fixing post protrudes from an end of the securing portion, the fixing portion of the mounting seat comprises a bottom plate, a pair of sidewalls protruding from opposite sides of the bottom plate, a pair of connection portions connecting the pair of sidewalls with the sleeve, and a pair of engaging arms respectively extending from the pair of connection portions along a direction parallel to the sidewalls, the pair of engaging arms is received between the pair of sidewalls, and engages with the securing portion of the fixing seat to secure the Kevlar lines of the optical fiber cable.

4. The optical fiber connector of claim 3, wherein each engaging arm comprises a clamping portion facing the other engaging arm, the securing portion is clamped between the pair of clamping portions, and comprises a pair of engaging portions and a mounting groove bounded by the pair of engaging portions, the pair of engaging portions respectively engages with the pair of clamping portions to clamp the Kevlar lines.

5. The optical fiber connector of claim 4, wherein the clamping portion comprises a plurality of first engaging protrusions, thereby forming a plurality of first engaging grooves, each first engaging groove is bounded by two adjacent first engaging protrusions, each engaging portion comprises a plurality of second engaging protrusions, thereby forming a plurality of second engaging grooves, each second engaging groove is bounded by two adjacent second engaging protrusions, the plurality of first engaging protrusions of the fixing portion engages into the plurality of second engaging grooves of the fixing seat, and the plurality of second engaging protrusions of the fixing seat engages into the plurality of first engaging grooves of the fixing portion.

6. The optical fiber connector of claim 3, wherein the covering member comprises a base plate, a pair of side plates extending from opposite sides of the base plate, and a pair of clamping arms between the pair of side plates, the pair of clamping arms respectively clamps the pair of engaging arms to clamp the plurality of Kevlar lines.

7. The optical fiber connector of claim 6, wherein each side plate defines a positioning hole, each sidewall of the mounting seat comprises a positioning post, the positioning post is received in the positioning hole to rotatably connect the covering member to the mounting seat.

8. The optical fiber connector of claim 7, wherein the fixing seat further comprises a pair of elastic arms extending from an end of the main body, the pair of elastic arms is parallel to each other and located at opposite sides of the securing portion, each elastic arm comprises a latching portion away from the other elastic arm, each sidewall of the fixing portion defines a first clamping groove adjacent to the positioning post, the latching portion is received in the first clamping groove.

9. The optical fiber connector of claim 8, wherein the covering member further comprises a resisting portion at an end of the base plate away from the positioning hole, the resisting portion is located between the pair of the side plates, the fixing seat further comprises a supporting portion protruding from an end of the main body away from the pair of elastic arms, the resisting portion engages with the supporting portion to receive the fixing post of the fixing seat.

10. The optical fiber connector of claim 7, wherein each side plate defines a latching groove at an end thereof away from the positioning hole, each sidewall comprises a clamping protrusion at an end thereof away from the positioning post, the clamping protrusions are received in the latching grooves.

11. An optical fiber connector, comprising:
a housing;
a fiber clamping assembly;
a fiber ferrule clamped at an end of the fiber clamping assembly; and
a fixing assembly, comprising:
a mounting seat comprising a pair of engaging arms;
a fixing seat received in the mounting seat, the fixing seat comprising a pair of engaging portions; and
a covering member rotatably mounted on the mounting seat to clamp the fixing seat therebetween, wherein the housing is sleeved on an end of the mounting seat, the fiber clamping assembly and the fiber ferrule are received in the mounting seat, the fixing seat comprises a fixing post axially defining a through hole, the fiber ferrule is aligned to the fixing post, the pair of engaging arms engages with the pair of engaging portions.

12. The optical fiber connector of claim 11, wherein the mounting seat comprises a sleeve and a fixing portion protruding from an end of the sleeve, the sleeve axially defines a receiving hole, the housing is sleeved on the sleeve, the fiber clamping assembly is received in the receiving hole.

13. The optical fiber connector of claim 12, wherein the fixing seat comprises a main body and a securing portion protruding from the main body, the fixing post protrudes from an end of the securing portion, the fixing portion comprises a bottom plate, a pair of sidewalls protruding from opposite sides of the bottom plate, and a pair of connection portions connecting the pair of sidewalls with the sleeve, the pair of engaging arms respectively extends from the pair of connection portions along a direction parallel to the sidewalls, the pair of engaging arms is received between the pair of sidewalls, and engages with the securing portion of the fixing seat.

14. The optical fiber connector of claim 13, wherein each engaging arm comprises a clamping portion facing the other engaging arm, the securing portion is clamped between the pair of clamping portions, and a mounting groove is bounded by the pair of engaging portions, the pair of engaging portions respectively engages with the pair of clamping portions.

15. The optical fiber connector of claim 14, wherein the clamping portion comprises a plurality of first engaging protrusions, thereby forming a plurality of first engaging grooves, each first engaging groove is bounded by two adjacent first engaging protrusions, the engaging portion comprises a plurality of second engaging protrusions, thereby forming a plurality of second engaging grooves, each second engaging groove is bounded by two adjacent second engaging protrusions, the plurality of first engaging protrusions of the fixing portion engages in the plurality of second engaging grooves of the fixing seat, and the plurality of second engaging protrusions of the fixing seat engages in the plurality of first engaging grooves of the fixing portion.

16. The optical fiber connector of claim 13, wherein the covering member comprises a base plate, a pair of side plates extending from opposite sides of the base plate, and a pair of clamping arms between the pair of side plates, the pair of clamping arms respectively clamps the pair of engaging arms.

17. The optical fiber connector of claim 16, wherein each side plate defines a positioning hole, each sidewall of the mounting seat comprises a positioning post, the positioning post is received in the positioning hole to rotatably connect the covering member to the mounting seat.

18. The optical fiber connector of claim 17, wherein the fixing seat further comprises a pair of elastic arms extending from an end of the main body, the pair of elastic arms is parallel to each other and located at opposite sides of the securing portion, each elastic arm comprises a latching portion, each sidewall of the fixing portion defines a first clamping groove adjacent to the positioning post, the latching portion is received in the first clamping groove.

19. The optical fiber connector of claim 18, wherein the covering member further comprises a resisting portion at an end of the base plate away from the positioning hole, the resisting portion is located between the pair of the side plates, the fixing seat further comprises a supporting portion protruding from an opposite end of the main body away from the pair of elastic arms, the resisting portion engages with the supporting portion to receive the fixing post of the fixing seat.

20. The optical fiber connector of claim 17, wherein each side plate defines a latching groove at an end thereof away from the positioning hole, each sidewall comprises a clamping protrusion at an end away from the positioning post, the clamping protrusions are received in the latching grooves.

* * * * *